United States Patent
Olsson et al.

(10) Patent No.: US 9,651,711 B1
(45) Date of Patent: May 16, 2017

(54) BORING INSPECTION SYSTEMS AND METHODS

(71) Applicant: SeekTech, Inc., San Diego, CA (US)

(72) Inventors: Mark S. Olsson, La Jolla, CA (US);
Ray Merewether, La Jolla, CA (US);
Eric M Chapman, Santee, CA (US);
Alex L Warren, San Diego, CA (US)

(73) Assignee: SEESCAN, INC., San Diego, CA (US)

( * ) Notice: Subject to any disclaimer, the term of this patent is extended or adjusted under 35 U.S.C. 154(b) by 304 days.

(21) Appl. No.: 13/779,371

(22) Filed: Feb. 27, 2013

Related U.S. Application Data

(60) Provisional application No. 61/603,847, filed on Feb. 27, 2012.

(51) Int. Cl.
*E21B 44/00* (2006.01)
*G01V 9/00* (2006.01)
*E21B 7/04* (2006.01)
*E21B 47/00* (2012.01)

(52) U.S. Cl.
CPC ............... *G01V 9/00* (2013.01); *E21B 7/046* (2013.01); *E21B 44/00* (2013.01); *E21B 47/0002* (2013.01)

(58) Field of Classification Search
CPC ....... E21B 7/046; E21B 44/00; E21B 47/0002
USPC .............................................. 175/45; 348/85
See application file for complete search history.

(56) References Cited

U.S. PATENT DOCUMENTS

| | | | | |
|---|---|---|---|---|
| 3,817,411 A * | 6/1974 | Brown | | 414/694 |
| 4,536,789 A * | 8/1985 | Bains | | E02F 3/9206 348/335 |
| 4,884,847 A * | 12/1989 | Bessinger | | E21C 35/24 175/40 |
| 5,025,868 A * | 6/1991 | Wentworth | | E21B 4/145 173/131 |
| 5,133,417 A * | 7/1992 | Rider | | 175/45 |
| 5,163,521 A * | 11/1992 | Pustanyk | | E21B 7/04 175/107 |
| 5,457,995 A * | 10/1995 | Staton et al. | | 73/596 |
| 5,720,354 A * | 2/1998 | Stump et al. | | 175/26 |

(Continued)

OTHER PUBLICATIONS

Amstutz, Jay, "Ridgid CrossChek Inspection System—Utility Bore Slot Drilling," Cop Tool Website, Apr. 24, 2012, pp. 1-3, Ohio Power Tool, Ohio, USA. http://www.coptool.com/ridgid-crosschek-inspection-system-utility-bore-slot-drilling/.

(Continued)

*Primary Examiner* — David Harvey
(74) *Attorney, Agent, or Firm* — Steven C. Tietsworth, Esq.

(57) ABSTRACT

This disclosure relates generally to apparatus, systems, and methods for boring in earth or other environments, both manmade and natural. More specifically, but not exclusively, the disclosure relates to devices and methods for inspecting the path of a bore (e.g., including horizontal, angular, vertical bores in 3-dimensional space) to detect any damage caused by the boring activity to infrastructure in the path of the bore. Such infrastructure may include, but not by way of limitation, gas lines, sewer lines, communication lines (e.g., fiber optic lines), electric lines, and other infrastructure. The disclosure further relates to devices and methods for mapping locations of underground objects, geological compositions, and other detectable underground features.

18 Claims, 13 Drawing Sheets

(56) References Cited

U.S. PATENT DOCUMENTS

| | | | | |
|---|---|---|---|---|
| 5,725,061 | A * | 3/1998 | Van Steenwyk | E21B 4/02 175/104 |
| 5,904,210 | A * | 5/1999 | Stump et al. | 175/45 |
| 6,041,860 | A * | 3/2000 | Nazzal | E21B 23/002 166/250.01 |
| 6,041,960 | A * | 3/2000 | Leal | B65F 1/1615 215/306 |
| 6,161,625 | A * | 12/2000 | Mati | 172/96 |
| 6,191,585 | B1 * | 2/2001 | Mercer | E21B 44/00 175/45 |
| 6,308,787 | B1 * | 10/2001 | Alft | 175/48 |
| 6,313,755 | B1 * | 11/2001 | Hetmaniak | C09K 11/025 172/5 |
| 6,315,062 | B1 * | 11/2001 | Alft | E21B 7/046 166/255.2 |
| 6,405,798 | B1 * | 6/2002 | Barrett | E21B 17/028 166/250.01 |
| 6,450,104 | B1 * | 9/2002 | Grant | B08B 9/049 104/138.1 |
| 6,833,795 | B1 * | 12/2004 | Johnson | G01V 3/12 166/255.1 |
| 7,930,103 | B2 * | 4/2011 | Young | G01V 1/00 342/22 |
| 8,988,969 | B2 * | 3/2015 | Wallbom et al. | 367/81 |
| 2005/0061547 | A1 * | 3/2005 | Wilson-Langman | E21B 47/00 175/40 |
| 2010/0059219 | A1 * | 3/2010 | Roberts | E21B 47/0002 166/250.01 |
| 2012/0006597 | A1 * | 1/2012 | Boike | 175/45 |
| 2012/0098675 | A1 * | 4/2012 | Volkel | 340/854.9 |
| 2012/0292110 | A1 * | 11/2012 | Downton | E21B 47/022 175/45 |
| 2013/0008723 | A1 * | 1/2013 | Hoelting et al. | 175/317 |
| 2013/0020130 | A1 * | 1/2013 | Trinh et al. | 175/45 |
| 2013/0025939 | A1 * | 1/2013 | Heliot | E21B 47/022 175/45 |
| 2014/0022088 | A1 * | 1/2014 | Chau | E21B 44/00 340/854.1 |
| 2014/0192180 | A1 * | 7/2014 | Sooy | G03B 37/005 348/85 |

OTHER PUBLICATIONS

Ridgid, "CrossChek Inspection—Wet Clay," YouTube Video, Mar. 7, 2012, Ridge Tool Company, Ohio,USA. https://www.youtube.com/watch?v=pMa_7sZaqdU.

Ridgid, "Ridgid CrossChek Inspection System," User's Manual, Mar. 1, 2012, p. 1, Ridge Tool Company, Ohio, USA. https://cdn2.ridgid.com/resources/media?key=2cd8cace-eb32-40d4-8b23-46998dfe9b52&languageCode=en&countryCode=US&type=document.

Staff Writer, "Ridgid CrossChek: Pipe Inspection Made Easy," Underground Focus Magazine, Jul. 31, 2012, pp. 1-3 http://underspace.com/ridgid-crosschek-pipe-inspection-made-easy/.

* cited by examiner

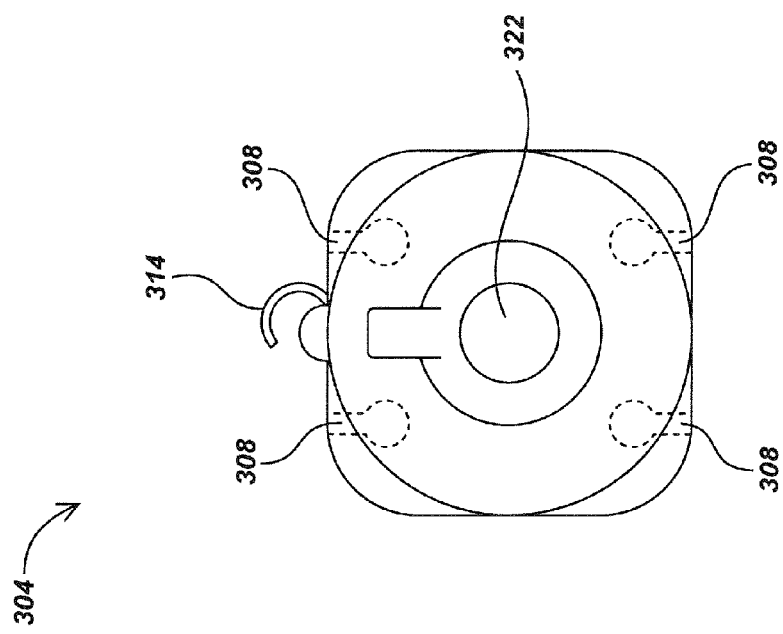

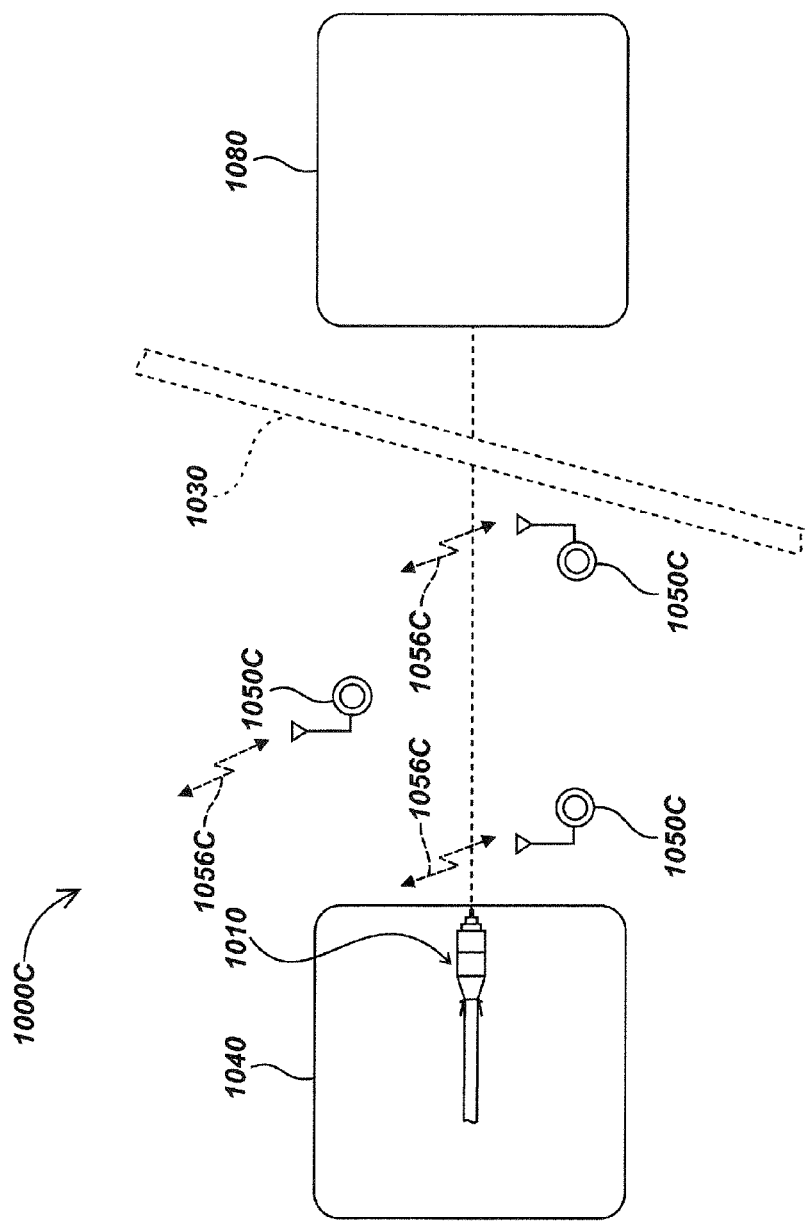

BORING INSPECTION SYSTEMS AND METHODS

CROSS REFERENCE TO RELATED APPLICATIONS

This application claims priority under 35 U.S.C. §119(e) to U.S. Provisional Patent Application Ser. No. 61/603,847, filed Feb. 27, 2012, entitled HORIZONTAL BORING INSPECTION DEVICE AND METHODS, the contents of which are incorporated by reference herein in their entirety for all purposes.

FIELD

This disclosure relates generally to apparatus, systems, and methods for boring in earth. More specifically, but not exclusively, the disclosure relates to devices and methods for inspecting the path of a horizontal bore to detect any damage caused by the boring activity to infrastructure (such as utility lines, phone lines, data lines, conduits, etc.) in the path of the bore.

BACKGROUND

Horizontal boring is commonly used for installing underground pipes, wires, and conduits along a prescribed bore path from the surface, with minimal impact to the surrounding area. Trenchless technology offers methods by which underground utilities may be installed without damage to overlying pavement, if proper precautions are observed.

Directional boring systems and methods using such systems are known in the art. For example, large horizontal directional drilling may be used to cut through solid rock. Depending on the local geology, different heads may be used in such drilling rigs. Underground pneumatic piercing tools are often referred to as hogs, air hogs, or pneuma-gophers. These tools may be used in the installation of public utilities, electricity, gas, phone, and cable television when it is not plausible or cost-effective to plow or trench into the ground. Some of these instances may include, under driveways, roads, sidewalks, and landscaping.

Pneumatic piercing tools are a lower cost alternative to directional boring. The tool is cylindrical in shape and uses air to pound its way through the ground underneath the obstruction. Pipe ramming may be used drive a pipe horizontally through softer soil. Auger boring or horizontal directional drilling may be useful when soil conditions are too hard for a pneumatic boring system. Pneumatic boring systems may be difficult or impossible to steer once started on their course, although they can be deflected by areas of high density. They can blindly intersect and damage a pre-existing utility installation such as a gas or water line or some other underground infrastructure. This hazard becomes more pronounced when operating in mature urban areas where historic installations may be insufficiently documented, for example.

Accordingly, there is a need in the art to address the above-described, as well as other problems.

SUMMARY

This disclosure relates generally to apparatus, systems, and methods for boring in earth or other environments, both manmade and natural. More specifically, but not exclusively, the disclosure relates to devices and methods for inspecting the path of a bore (e.g., including horizontal, angular, vertical bores in 3-dimensional space) to detect any damage caused by the boring activity to infrastructure in the path of the bore. Such infrastructure may include, but not by way of limitation, gas lines, sewer lines, communication lines (e.g., fiber optic lines), electric lines, and other infrastructure. The disclosure further relates to devices and methods for mapping locations of underground objects, geological compositions, and other detectable underground features.

In one aspect, the disclosure relates to a system for inspecting the path of a borehole beneath a surface. The system may comprise one or more sensors including one or more pressure, acoustic, image, motion, vibration, thermal, chemical, moisture, current, magnetic, or inertial sensors. The one or more sensors may be configured to collect information relating to an intersection involving the borehole and an object or cavity beneath the surface.

The one or more sensors may be configured to collect first information relating to a first intersection involving the borehole and a utility conduit. The first information may include pressure measurements, acoustic measurements or other measurements from one or more sensors at one or more instances of time. The measurements may be compared to detect environmental changes that may be related to a borehole crossing into a utility conduit (e.g., a sewer line).

Various additional aspects, features, and functions are further described below in conjunction with the appended Drawing figures.

BRIEF DESCRIPTION OF THE DRAWINGS

The present disclosure may be more fully appreciated in connection with the following detailed description taken in conjunction with the accompanying drawings, wherein:

FIG. 4 is an end view of an embodiment of a pipe-end carrier unit;

FIG. 10C depicts a bird's eye view of yet another acoustic tomography system.

DETAILED DESCRIPTION OF EMBODIMENTS

Figure 1:
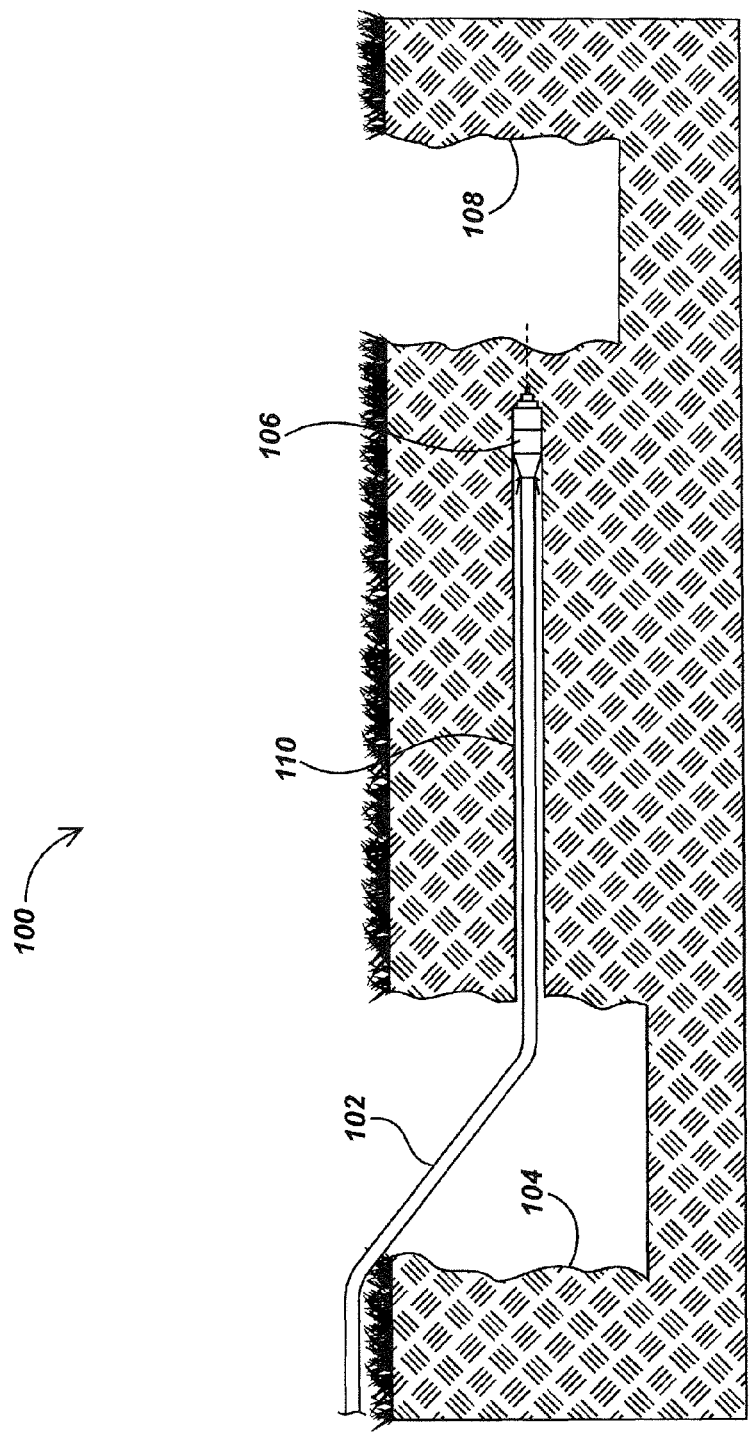
FIG. 1 illustrates an embodiment of a horizontal boring system in use.

This disclosure relates generally to apparatus, systems, and methods for boring in earth or other environments, both manmade and natural. More specifically, but not exclusively, the disclosure relates to devices and methods for inspecting the path of a bore (e.g., including horizontal, angular, vertical bores in 3-dimensional space) to detect any damage caused by the boring activity to infrastructure in the path of the bore. Such infrastructure may include, but not by way of limitation, utility conduits such as gas lines, sewer lines, communication lines (e.g., fiber optic lines), plumbing lines, and electric lines. Detection of damage to infrastructure may be detected using various sensing components and analysis of sensed conditions. Certain aspects disclosed herein may also be configured to detect cavities (e.g., sink holes) and other underground features.

The disclosure further relates to apparatus, systems, and methods for mapping locations of underground objects, geological compositions, and other detectable underground features. The disclosure further relates to using maps of underground objects to determine a preferred path of a borehole that avoids intersecting with mapped objects, or to more-quickly diagnose a collision between a bore and a buried object.

The disclosure further relates to apparatus, systems, and methods for inspecting the integrity of a bore, or the equipment that creates the bore using various means, including sensors.

The disclosure further relates to apparatus, systems and methods for tracking the position of a bore or a collision between a bore and underground object using one or more location devices.

Various details of the disclosure herein may be combined with inspection camera systems and components such as those described in co-assigned patents and patent applications, including U.S. Pat. No. 6,697,102, issued Feb. 24, 2004, entitled BORE HOLE CAMERA WITH IMPROVED FORWARD AND SIDE VIEW ILLUMINATION, U.S. Pat. No. 6,831,679, issued Dec. 14, 2004, entitled VIDEO CAMERA HEAD WITH THERMAL FEEDBACK LIGHTING CONTROL, U.S. Pat. No. 6,862,945, issued Mar. 8, 2005, entitled CAMERA GUIDE FOR VIDEO PIPE INSPECTION SYSTEM, U.S. Pat. No. 6,958,767, issued Oct. 25, 2005, entitled VIDEO PIPE INSPECTION SYSTEM EMPLOYING NON-ROTATING CABLE DRUM STORAGE, U.S. patent application Ser. No. 11/928,818, filed Oct. 30, 2007, entitled PIPE MAPPING SYSTEM, U.S. Patent Application No. 61/034,907, filed Mar. 7, 2008, entitled PIPE INSPECTION IMAGING SYSTEM, U.S. patent application Ser. No. 12/704,808, filed Feb. 12, 2010, entitled PIPE INSPECTION SYSTEM WITH REPLACEABLE CABLE STORAGE DRUM, U.S. patent application Ser. No. 12/399,859, filed Mar. 6, 2009, entitled PIPE INSPECTION SYSTEM WITH SELECTIVE IMAGE CAPTURE, U.S. patent application Ser. No. 12/975,496, filed Jun. 8, 2012, entitled MULTI-CAMERA PIPE INSPECTION APPARATUS, SYSTEMS, & METHODS, and U.S. patent application Ser. No. 13/358,463, filed Jan. 25, 2012, entitled SELF-LEVELING INSPECTION SYSTEMS AND METHODS, U.S. Pat. No. 7,009,399, entitled OMNIDIRECTIONAL SONDE AND LINE LOCATOR, issued Mar. 7, 2006, U.S. Pat. No. 7,443,154, entitled MULTI-SENSOR MAPPING OMNIDIRECTIONAL SONDE AND LINE LOCATOR, issued Oct. 28, 2008,U.S. Pat. No. 7,518,374, entitled RECONFIGURABLE PORTABLE LOCATOR EMPLOYING MULTIPLE SENSOR ARRAY HAVING FLEXIBLE NESTED ORTHOGONAL ANTENNAS, issued Apr. 14, 2009, U.S. Pat. No. 7,619,516, entitled SINGLE AND MULTI-TRACE OMNIDIRECTIONAL SONDE AND LINE LOCATORS AND TRANSMITTERS USED THEREWITH, issued Nov. 17, 2009, and U.S. patent application Ser. No. 13/532,721, filed Jun. 25, 2012, entitled MODULAR BATTERY PACK APPARATUS, SYSTEMS, AND METHODS, U.S. patent application Ser. No. 13/358, 463, filed Jan. 25, 2012, entitled SELF-LEVELING INSPECTION SYSTEMS AND METHODS, U.S. Patent Application No. 61/657,721, filed Jun. 8, 2012, entitled MULTI-CAMERA PIPE INSPECTION APPARATUS, SYSTEMS, & METHODS, U.S. patent application Ser. No. 11/928,818, filed Oct. 30, 2007, entitled PIPE MAPPING SYSTEM, U.S. patent application Ser. No. 12/399,859, filed Mar. 7, 2009, entitled PIPE INSPECTION SYSTEM WITH SELECTIVE IMAGE CAPTURE, U.S. patent application Ser. No. 13/754,767, filed Jan. 30, 2013, entitled ADJUSTABLE VARIABLE RESOLUTION INSPECTION SYSTEMS AND METHODS, U.S. patent application Ser. No. 12/442,504, filed Mar. 31, 2012, entitled DUAL ANTENNA SYSTEMS WITH VARIABLE POLARIZATION, U.S. patent application Ser. No. 13/189,844, filed Jul. 25, 2011, Entitled TRI-POD BURIED LOCATOR AND USER INTERFACES, and U.S. patent application Ser. No. 13/757, 888, filed Sep. 14, 2012, entitled SONDE DEVICES INCLUDING A SECTIONAL FERRITE CORE STRUCTURE. The content of each of these applications is incorporated by reference herein in its entirety.

As used herein, the terms sonde, single or multi-axis sonde, array of sondes, or array of single or multi-axis sondes refer to signal transmitters, such as a magnetic dipole transmitter having a characteristic or modulated frequency and phase, that actively or passively transmit a signal to a base unit, such as a utility locating device.

Aspects of the Disclosure

In one aspect, the disclosure relates to a pneumatic boring system. Such a system may enable an operator to attach a camera device to a boring head and inspect the interior of the bore path while pulling pipe through the bore hole.

In another aspect, the disclosure relates to a method for use in pneumatic boring system which may enable an operator to pull a camera device inside a pipe and through a bore path, attach the device to the air supply line of the pneumatic boring device, and inspect the bore hole while pulling pipe and camera back through the path in a single pull.

In another aspect, a camera device may be fitted to the back of the pneumatic boring hammer allowing the operator to inspect the bore path just behind the tool as the bore is occurring.

In another aspect, the disclosure relates to a device and a method to test a bore for intersection with underground objects (e.g., a sewer line) by adding a seal and instrumented pressure transducer in combination with a data relay means such as a sonde to allow monitoring of air pressure behind the hammer, thus detecting a pressure change in the event the bore head enters a void.

In another aspect the present disclosure relates to means and methods of using a horizontal boring system in order to detect unanticipated events such as intruding into the path of an existing utility.

In another aspect, the disclosure relates to means for implementing the above-described methods and/or system or device functions, in whole or in part.

In another aspect, the disclosure relates to a system for inspecting the path of a borehole beneath a surface. The system may comprise one or more sensors including one or more pressure, acoustic, image, motion, vibration, thermal, chemical, moisture, current, magnetic, or inertial sensors. The one or more sensors may be configured to collect information relating to an intersection involving the borehole and an object or cavity beneath the surface.

In another aspect, the one or more sensors may be configured to collect first information relating to a first intersection involving the borehole and a utility conduit. The first information may include a first pressure measurement by a first pressure sensor at a first instance of time, and a second pressure measurement by the first pressure sensor at a second instance of time, where the system further comprises a processing component operable to identify the first intersection when a difference between the first and second pressure measurements exceeds a threshold amount of change. The first pressure measurement may include a first air pressure pulse shape, and the second pressure measurement may include a second air pressure pulse shape.

In another aspect, the first information may include a first pressure measurement by a first pressure sensor at a first instance of time, and a second pressure measurement by a second pressure sensor at the first instance of time. The system may further comprise a processing component operable to identify the first intersection when a difference between the first and second pressure measurements exceeds a threshold amount of change.

In another aspect, the first information may include a first pressure measurement by a first pressure sensor at a first instance of time, a second pressure measurement by a second pressure sensor at the first instance of time, a third pressure measurement by the first pressure sensor at a second instance of time, a fourth pressure measurement by the second pressure sensor at the second instance of time. The system may further comprise a processing component operable to determine a first difference between the first and second pressure measurements, and a second difference between the third and fourth pressure measurements, where the processing component may be further operable to identify the first intersection when a third difference between the first difference and the second distance exceeds a threshold amount.

In another aspect, the first information may include a first acoustic measurement by a first acoustic sensor at a first instance of time, and a second acoustic measurement by the first acoustic sensor at a second instance of time. The system may further comprise a processing component operable to identify the first intersection when a difference between the first and second acoustic measurements exceeds a threshold amount of change.

In another aspect, the first acoustic measurement may include a first measured resonance of exhaust air from a boring tool, and the second acoustic measurement may include a second measured resonance of exhaust air from a boring tool.

In another aspect, the first information may include a first acoustic measurement by a first acoustic sensor at a first instance of time, and a second acoustic measurement by a second acoustic sensor at the first instance of time. The system may further comprise a processing component operable to identify the first intersection when a difference between the first and second acoustic measurements exceeds a threshold amount of change.

In another aspect, the first information may include a first acoustic measurement by a first acoustic sensor at a first instance of time, a second acoustic measurement by a second acoustic sensor at the first instance of time, a third acoustic measurement by the first acoustic sensor at a second instance of time, a fourth acoustic measurement by the second acoustic sensor at the second instance of time. The system may further comprise a processing component operable to determine a first difference between the first and second acoustic measurements, and a second difference between the third and fourth acoustic measurements, where the processing component may be further operable to identify the first intersection when a third difference between the first difference and the second distance exceeds a threshold amount.

In another aspect, the one or more sensors include at least one pressure sensor configured to take a first pressure measurement during a first time period, at least one acoustic sensor configured to take a first acoustic measurement during the first time period, and at least one image sensor configured to capture a first image during the first time period.

In another aspect, the system may further comprise a processing component operable to identify a first collision between a bore and a utility conduit along the borehole based on the first pressure measurement, the first acoustic measurement or the first image.

In another aspect, the system may further comprise a sonde configured to transmit a position signal from the borehole, where the sonde may be coupled to a boring tool or a hose connected to the boring tool.

In another aspect, the one or more sensors include a plurality of acoustic tomography sensors configured to collect position information relating to a buried utility conduit that intersects with the borehole based on seismic signals generated by a boring tool during operation of the boring tool.

In another aspect, the system may further comprise an above-ground processing component configured to analyze sensor measurements from the one or more sensors.

In another aspect, the above-ground processing component may be further configured to generate an alert signal when the sensor measurements indicate an occurrence of a collision between a boring tool and a buried utility conduit along the borehole. The system may further comprise an output component configured to provide a representation of the alert signal to a user.

In another aspect, the system may further comprise a hose, and a boring tool coupled to the hose, where the one or more sensors may be coupled to the boring tool.

In another aspect, the system may further comprise a hose, and a boring tool coupled to the hose, where the one or more sensors may be coupled to an external surface of the hose.

In another aspect, the one or more sensors may include a camera, a hose attachment assembly, an object attachment assembly, at least one rod, and a locking feature. The hose attachment assembly may comprise an outer hose attachment component and an inner hose attachment component, where the outer hose attachment component and the inner hose attachment component may be each configured to couple with each other, and where the outer hose attachment component includes an outer quick-release coupling feature configured to couple to an inner quick-release coupling feature of the inner hose attachment component. The object attachment assembly may be configured to receive at least one camera through an opening of the object attachment assembly, where the object attachment assembly may comprise an outer pipe attachment component and an inner pipe attachment component, where the outer pipe attachment component and the inner pipe attachment component may be each configured to couple with each other, and where the outer pipe attachment component includes an outer quick-release coupling feature configured to couple to an inner quick-release coupling feature of the inner pipe attachment component. The at least one rod may have a first end and a second end, where the first end couples to the hose attachment assembly and the second end couples to the object attachment assembly. The locking feature may be configured to lock the at least one camera inside the opening, where the hose attachment assembly may be configured to couple to a hose, and the object attachment assembly may be configured to couple to a pipe or other utility.

The following exemplary embodiments are provided for the purpose of illustrating examples of various aspects, details, and functions relating to apparatus, systems, and methods for boring in earth. However, the described embodiments are not intended to be in any way limiting. It will be apparent to one of ordinary skill in the art that various aspects may be implemented in other embodiments within the spirit and scope of the present disclosure.

It is noted that as used herein, the term "exemplary" means "serving as an example, instance, or illustration." Any aspect, detail, function, implementation, and/or embodiment described herein as "exemplary" are not necessarily to be construed as preferred or advantageous over other aspects and/or embodiments.

Exemplary Embodiments of the Disclosure

Referring to FIG. 1, a horizontal boring device 100 is illustrated. In one aspect, an air hose 102 may be guided from a starting pit 104, and may be connected to a pneumatic boring head 106 on a path that may lead to a target pit 108. In typical operations the borehole 110 may be formed by the boring head 106 as it drives through the earth powered by pneumatic impulses. Once the borehole 110 is complete to the target pit 108, a flexible conduit, poly pipe (not shown), or other object, may be attached and pulled back through the borehole.

In typical operation, the pneumatic boring head 106 will remain on the path that it was started in the starting pit 104, unless it encounters unusual densities or obstacles in its path (e.g., geological obstructions like rocks or dense soil, or manmade obstructions). Should an existing utility line, pipeline, conduit, sewer, or the like, fall across the projected path of the borehole 110, the pneumatic boring head 106 may cause damage to the crossing utility if the boring head 106 strikes, punctures, enters, severs, or otherwise comes in contact with the utility.

Figure 2:
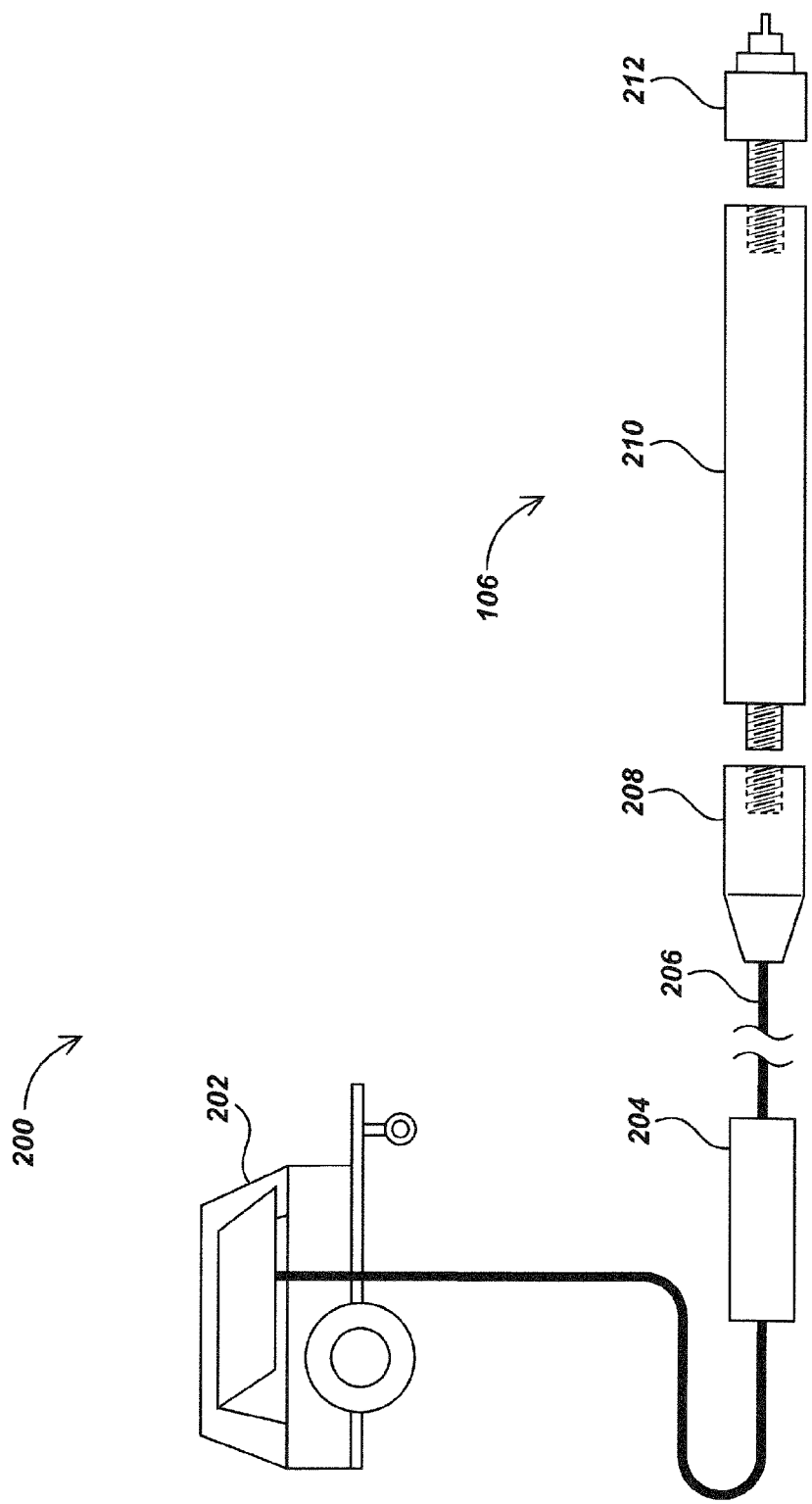
FIG. 2 is a schematic illustrating details of a horizontal boring system embodiment.

Referring to FIG. 2, the components of a horizontal boring deployment are depicted. An air compressor 202 may provide a high-pressure air lubricator 204 by means of an air hose 206. The lubricator 204 may provide a vaporized lubricant to the airflow which may contribute to the safe operation of a soil displacement hammer (not shown) which may operate the pneumatic boring head 106. The air hose 206 may be attached to the pneumatic boring head 106 by means of a tail assembly 208 which may be threaded to a main casing 210 holding the pneumatic hammer element (not shown) and to the casing tip assembly 212 which may be driven by the soil displacement hammer (not shown). A typical pneumatic boring tool, for example, is the "Grundomat 130" model available from TT Technologies, 2020 E. New York St., Aurora, Ill. 60502.

When the borehole 110 (FIG. 1) is completed in a typical operation, the path may need to be inspected if there is any possibility of having encountered a crossing utility during the bore operation. This has typically included, for example, pulling the pneumatic boring head 106 (FIG. 1) back through the borehole 110 and using a small camera on a push cable to inspect the hole for any sign of collision or other anomalous results.

In an exemplary embodiment of the present disclosure, a quick release attachment may be used for inspection to occur at the same time that a pipe or conduit is being pulled through the borehole 110. Alternatively, inspection may occur during the creation of the bore (i.e., during the operation of the boring head 106).

Figure 3A:
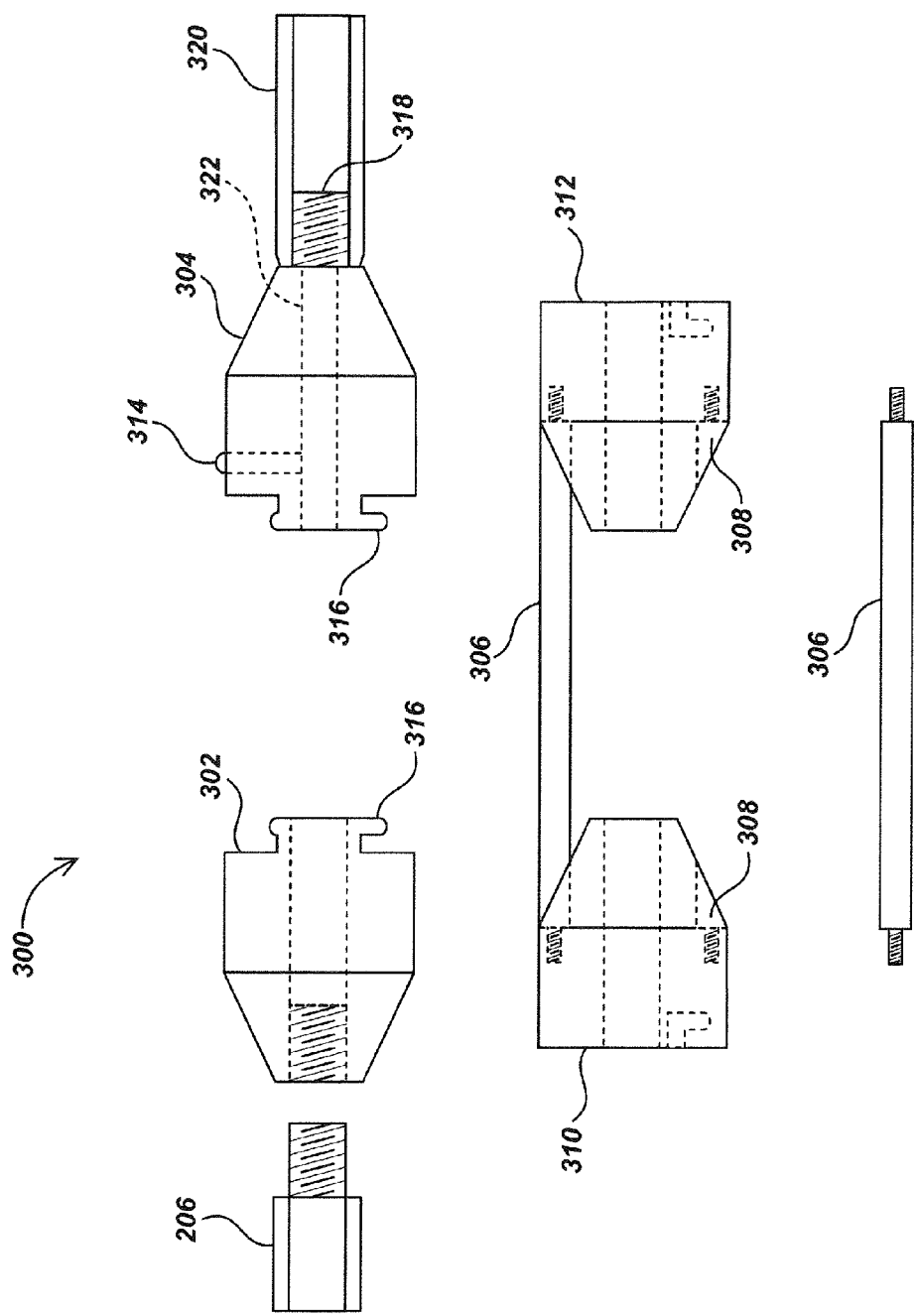
FIG. 3A is a side view of an embodiment camera carrier assembly.

Referring to FIG. 3A, an embodiment of a sensor carrier assembly 300 is illustrated. The assembly 300 may be configured to attach to the air hose 206 of FIG. 2, and also an object for insertion into the bore. The assembly 300 may be further configured to include various sensing components (e.g., an image sensor like a camera) to inspect the borehole 110 of FIG. 1.

Figure 5:
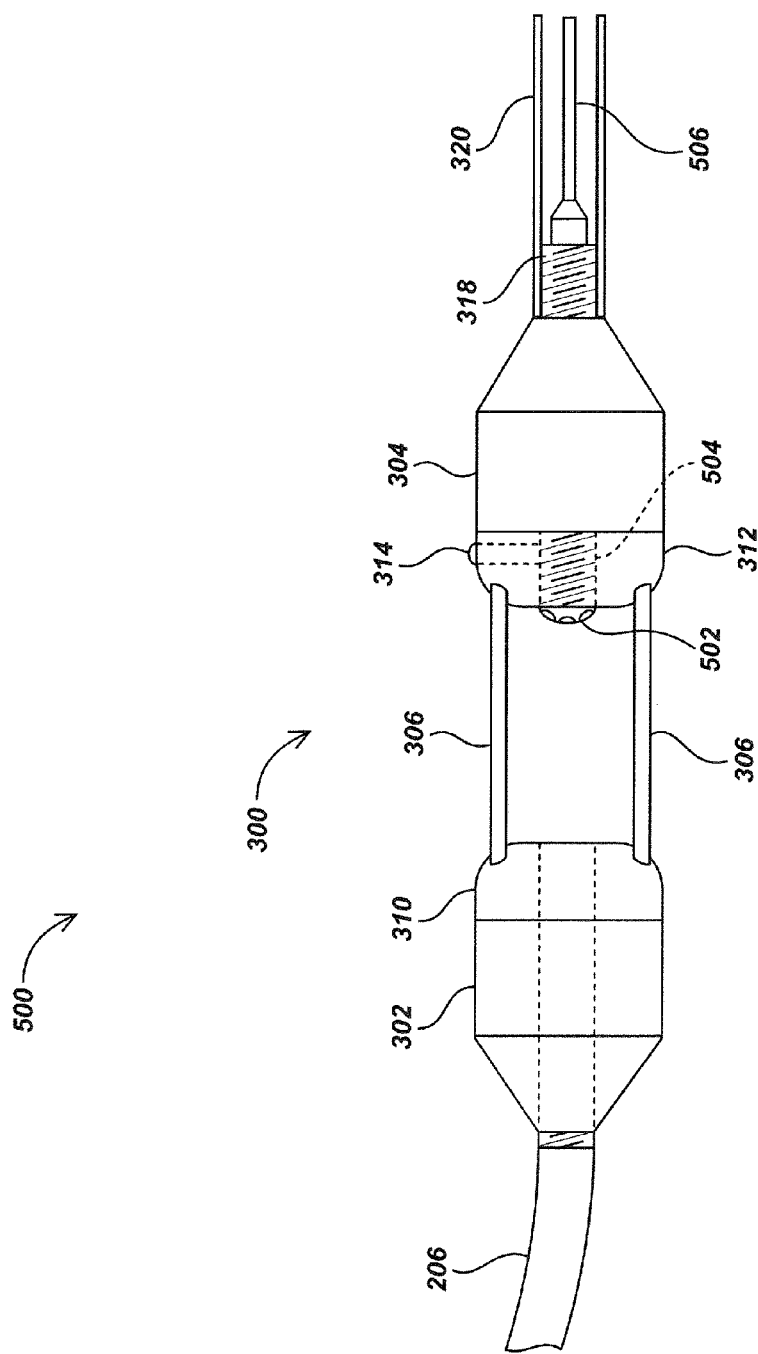
FIG. 5 is a side view of the camera carrier assembly.

By way of example, the pneumatic boring head 106 of FIG. 1 may, upon arriving at the target pit 108 of FIG. 1, be disconnected from the air hose 206 of FIG. 2. As shown, the air hose 206 may be uncoupled from the tail assembly 208, and may then be coupled to a hose-end carrier unit 302. An object—for example, a pipe 320 to be laid in the borehole 110 of FIG. 1—may be attached to a pipe-end carrier unit 304 which may have a tapered duct-puller end 318 machined into it. The pipe-end carrier unit 304 may have a central axial hole 322 bored through it (e.g., to receive a camera as shown in FIG. 5, or another object). Both the pipe-end carrier unit 304 and the hose-end carrier unit 302 may have quick-release attachment nodes 316 on their inner faces. The formed quick-release attachment nodes 316 may be capable of rapid twist-lock connection into a corresponding hose-end connection component 310 and a corresponding pipe-end connection component 312.

Figure 3B:
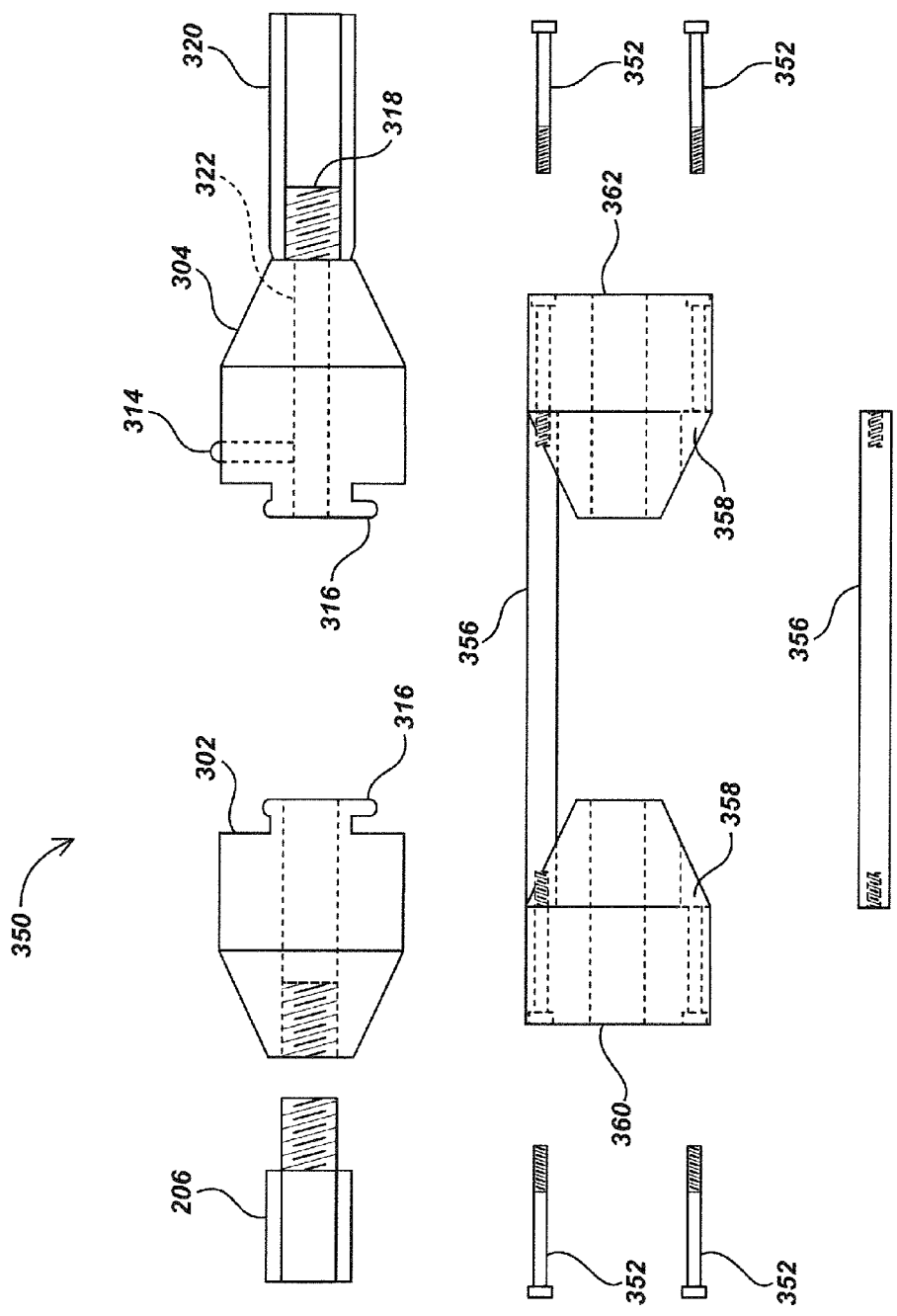
FIG. 3B is a side view of an alternative embodiment camera carrier assembly.

The hose-end connection component 310 and the pipe-end connection component 312 may be formed with a plurality of matching receptacles 308 configured at their facing sides. Each receptacle 308 on the inner face of the hose-end connection component 310 may align with a corresponding receptacle 308 on the inner face of the pipe-end connection component 312. A rigid connecting rod 306 may be locked into corresponding receptacles 308 on the hose end connection component 310 and the pipe-end connection component 312. A typical configuration may have one or more connecting rods 306 locking the hose-end connection component 310 and the pipe-end connection component 312 together in an approximately rigid configuration. In FIGS. 3A-B, one of the connecting rods 306 has been removed from its corresponding receptacles 308 for purposes of illustration. The connection between receptacle 308 and the rod 306 may be carried out using female and male threads (shown), adhesive, locking pins, or other features (not shown).

In FIG. 3B, an alternative carrier assembly 350 is illustrated, which may include similar aspects to those shown in the carrier assembly 300 of FIG. 3A. The alternative camera carrier assembly 350 may have a hose-end connecting component 360 and a pipe-end connecting component 362 similar in function and design to the hose-end connecting component 310 and the pip-end connecting component 362 of the carrier assembly 300 of FIG. 3A, but designed such that a series of bolts 352 may be used to secure connecting rods 356. This embodiment may be advantageous in increasing ease of manufacture. The hose-end connecting component 360 and pipe-end connecting component 362 may further connect to respective quick-release attachment nodes 316 formed on the hose-end carrier unit 302 and the pipe-end carrier unit 304 respectively.

Referring still to FIGS. 3A-B, the pipe-end carrier unit may be fitted with an exemplary locking mechanism 314 which may be manually locked onto or into protective spring coils attached to a typical pipe-inspection camera as later shown in FIG. 5.

Referring to FIG. 4, a perspective end view of a pipe-end carrier unit embodiment 304 is illustrated. Details of the manual locking mechanism 314 are illustrated. In an exemplary embodiment, receptacles 308 are illustrated with corresponding openings for the insertion of locking pins or screws to retain the connecting rod 306 (FIG. 3) associated with each receptacle 308. In this configuration, the connection between receptacle 308 and the rod 306 may be carried out using alternative means than threads (a shown in FIG. 3), including locking pins that may be configure to lock the rod 306 when into the receptacles 308. The locking pins may be inserted into a channel of the receptacles 308 that is perpendicular to or angularly offset from the channel into which the rod 306 inserts.

Referring to FIG. 5, details of an assembly 500 is illustrated. At each end of the carrier assembly 300, a connection component may be attached to a carrier unit. The hose-end carrier unit 302 may be attached to the carrier-end connection component 310, and the pipe-end carrier unit 304 to the pipe-end connection component 312. A miniature inspection camera 502 with a protective spring coil 504 may be fished through the poly pipe 320 and lead through the central opening 322 of FIGS. 3 and 4 to the end of the pipe-end connection component 312. The camera 502 may be locked in position through the camera lock mechanism 314 being lowered to engage the coils of the protective camera spring 504.

In such an operation the poly pipe 320 may be firmly engaged by the duct-puller formed end 318 of the pipe-end carrier unit 304, which in turn may be firmly connected to the rest of the carrier assembly 300 and the air hose 206. By drawing the air hose 206 back through the borehole 110 (FIG. 1), the edges of the borehole 110 of FIG. 1 may be illuminated and viewed by the camera 502 and may be viewed on a display unit (not shown) connected to the camera 502 by means of a camera cable 506.

Figure 6:
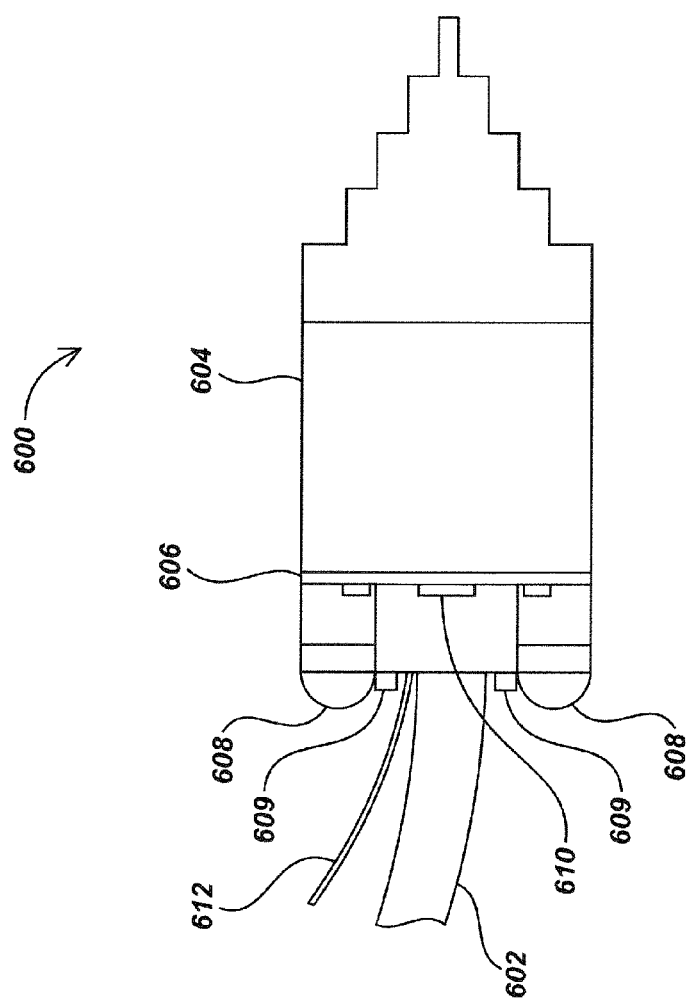
FIG. 6 is an embodiment of a pneumatic boring tool.
Figure 7:
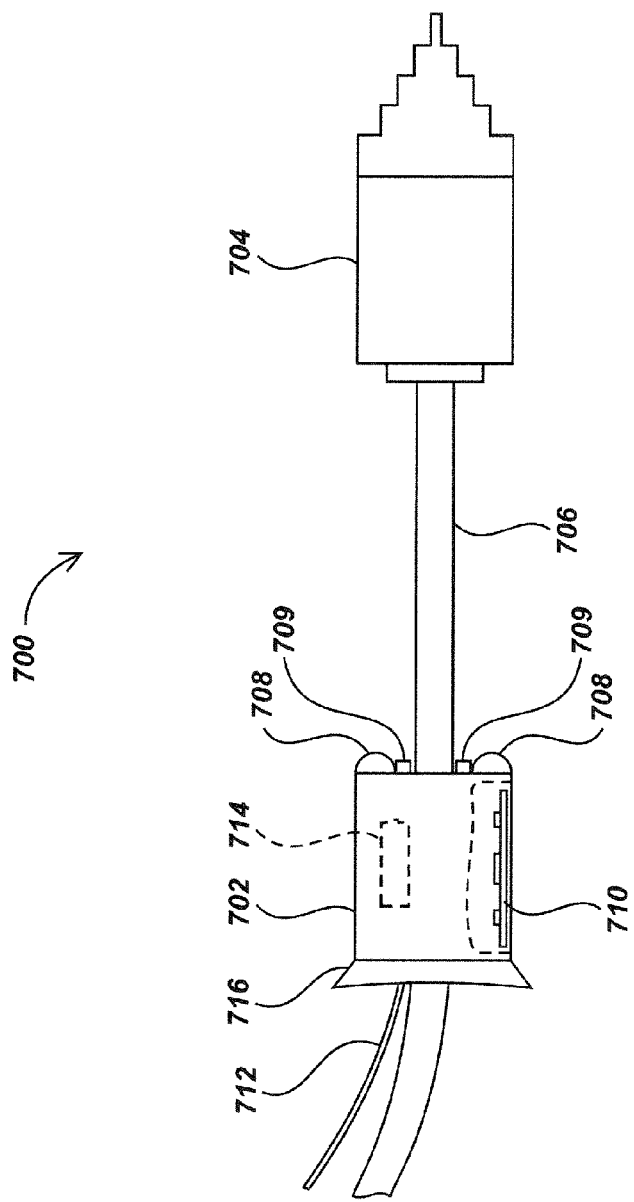
FIG. 7 is an embodiment of a pneumatic boring system.

As previously indicated, inspection features may be used to inspect a borehole during operation of a boring tool. FIGS. 6 and 7 illustrate various aspects of such inspection features.

Turning to FIG. 6, an embodiment of a pneumatic boring system 600 is illustrated. In one aspect, the boring system 600 may include a casing, such as modified casing 604 disposed at the end of an air hose 602. In another aspect, the boring system 600 may include a wired connection, such as a cable 612. Data exchange links and power may be provided via a wired connection, such as cable 612, or a wireless connection, such as a Bluetooth or Industrial, Scientific and Medical (ISM) radio link built into one or more circuit boards, such as a circuit board 606, which may be disposed on modified casing 604. Power may also be supplied via a battery (not shown).

The circuit board 606 may support a plurality of cameras 608 and lighting LEDs 609 enabling the cameras 608 to view the bore path behind the pneumatic boring system 600. The plurality of cameras 608 may operate simultaneously, or may be selectively operated to capture images of the path behind the casing 604. In some cases, debris may block the view of one of the cameras 608. Under such circumstances, another camera of the cameras 608 may selectively operate or otherwise be used to provide images of the bore. The cameras 608 may be arranged at various orientations to capture various directional images of the bore. Alternatively, the cameras 608 may be controlled to re-orient along a selectable direction, a camera may be configured to move outwardly into the bore to inspect into the bore or an intersecting object (e.g., sewer line). Moreover, the camera mounting (not labeled) may be configured to rotate in order to move a camera into a desired position (e.g., away from debris, closer to an intersecting object or cavity). Directional airflow (e.g., from exhaust) (not shown) may be configured to remove debris from obstructing a camera. An air control feature may receive air from the air hose 602, and then used to remove debris off of and away from the lenses of the cameras 608 using directional airflow.

An operator may detect that debris covers some or all of the viewing area of a camera, or the system may determine that the debris covers some or all of the viewing area (e.g., using various signal processing techniques, including comparison of image pixels, comparison of two images from different time periods, or comparison of two images from two cameras at the same instance of time). Once detected, various features may become operational, including the directional airflow, rotation of the mounting, switching of camera feeds, or other activities. Such activities may occur regardless of any detection of debris. Alternatively, directional airflow may be applied constantly, or intermittently (e.g., via a timer).

The cameras 608 may capture any type of images, including wide-angle images, low-light images (e.g., using night-vision imaging techniques), high-definition images, heat-based images, and other images, including counterparts to previously listed images.

Signals from a plurality of cameras 608 (and/or from the sensors 610) may be transmitted at the same time, and stereo or 3-dimensional (3D) images may be formed using techniques known in the art to form 3D models of the inside of the borehole. Include 9-211, 9-220 and 9-232 by reference. Constructed models (e.g., 3D models) may be used to detect voids or crossing utilities. Construction of the models may use additional data from remote sources, and may be accomplished with user intervention or may be automated. U.S. patent application Ser. No. 13/358,463, filed Jan. 25, 2012, entitled SELF-LEVELING INSPECTION SYSTEMS AND METHODS, U.S. Patent Application No. 61/657,721, filed Jun. 8, 2012, entitled MULTI-CAMERA PIPE INSPECTION APPARATUS, SYSTEMS, & METHODS, U.S. patent application Ser. No. 11/928,818, filed Oct. 30, 2007, entitled PIPE MAPPING SYSTEM, U.S. patent application Ser. No. 12/399,859, filed Mar. 7, 2009, entitled PIPE INSPECTION SYSTEM WITH SELECTIVE IMAGE CAPTURE, and U.S. patent application Ser. No. 13/754, 767, filed Jan. 30, 2013, entitled ADJUSTABLE VARIABLE RESOLUTION INSPECTION SYSTEMS AND METHODS. The content of each of these applications illustrates various such aspects, and is incorporated by reference herein in its entirety.

An array of sensors 610 may include pressure, acoustic, image, motion, vibration, thermal, chemical, moisture, current, magnetic, and/or inertial sensors, or other sensor circuits useful for detecting anomalous events such as a collision between the boring tool and a crossing utility conduit or other obstruction crossing the path of a borehole formed by the boring system 600. Detection of the events (e.g., collision between a boring tool and a utility conduit) may occur by correlating two measurements from two remote sensors of the same type, by correlating two measurements from the same sensor at two instances of time, or by other methods. Measurements may include pressure, temperature, exposure to gases or other chemicals, vertical or other deviation in relation to a horizontal path, change in resonance of exhaust air from the boring tool, or other measurements.

Various sensing functions and features are described below in relation to FIG. 7 and elsewhere. Those sensing functions and features may be incorporated into the system 600 of FIG. 6.

Although not shown, an output component positioned above ground may provide information to a user or another component (e.g., a database). The information may specify underground conditions and characteristics, including the trajectory of the borehole, any collisions between the bore and an object, any intersections between the borehole and an object, and types of objects, among other information. Auditory, visual, haptic or other alerts may be generated based on detected conditions or characteristics (e.g., when a collision or intersection occurs), or information may be simply presented (e.g., presenting images of the borehole).

The output device may take various forms, including a display (not shown)—e.g., a display of a locator, a smart phone, or other display with a user interface—configured to display images captured by the cameras 608. The display may further display information from the array of sensors 610, and may also display information from other sources (e.g., mappings of underground and above ground objects).

Turning to FIG. 7, an embodiment of a pneumatic boring system 700 is illustrated. System 700 may include, for example, a boring tool 704 disposed at the end of an air hose 706. System 700 may also include, for example, one or more cameras 708 and an illumination component to provide light for the cameras 708 (e.g., an LED component 709). The cameras 708 may operate similarly to cameras 608 of FIG. 6, and may optionally face rearward to view the path behind the carrier 702 as compared to in front of it as shown in FIG. 7. Accordingly, the various configurations and capabilities of cameras 608 are incorporate here by reference for cameras 708. An optional power source (e.g., a battery) 714 is also illustrated.

In one embodiment, the carrier 702 may be coupled to the air hose 706 (e.g., via a clamp, adhesive, or other coupling mechanism). In another embodiment, the carrier 702 may be integral with the air hose 702. Still, in another embodiment, the carrier 702 may include two coupling features configured to couple to two hose ends. Alternatively, the carrier 702 may couple directly with the boring tool 704.

The design of the carrier 702 may vary, and may include groves to direct debris (e.g., dirt and rock) behind the carrier 702, or to allow the carrier 702 to pass over the debris.

The carrier 702 may include one or more circuit boards, such as a circuit board 710. Circuit board 710 may be equipped with motion sensors, pressure sensors, acoustic sensor and other sensors useful for detecting anomalous events during a boring operation of the boring system 700. Data exchange links and power may be provided via a wired connection, such as cable 712 (which may be integrated into air hose 706), or a wireless connection, such as a Bluetooth or ISM radio link built into the circuit board 710. Alternative wireless connections may include RFID, sonde, or other wireless communication means. Such RFID and sonde components are not shown in FIG. 7, but are contemplated. Where wireless connections are used, a corresponding receiving or transceiving antenna may be place in a manner to receive the signal from the connection. For example, placement may include into the borehole, or at or near the borehole entrance.

A sonde incorporated into the carrier 702 of FIG. 7 may incorporate sectional ferrites, wherein the air passageway or air hose 706 may run centrally though the cylindrical cavity formed inside the group of sectional ferrites. Also sonde 918 (from FIG. 9) may be similarly constructed. Certain of these features (among other related information) may be found in U.S. patent application Ser. No. 13/757,888, filed Sep. 14, 2012, entitled SONDE DEVICES INCLUDING A SEC-TIONAL FERRITE CORE STRUCTURE, which is incorporate herein in its entirety for all purposes.

A method of testing a bore for intersection with a crossing conduit such as a sewer pipe, for example, may include the addition of a partial seal in the bore formed, for example, by a flexible flange or collar 716 around sensor carrier 702, such as a seal constructed for low-pressure bypass. An example of a similar seal is provided in FIG. 9 (e.g., see seal 940). Sensing devices such as pressure transducers mounted in sensor carrier 702 may be used to detect the abrupt pressure change that would occur if the pneumatic boring tool 704 should break into a crossing conduit such as a sewer pipe.

Instrumentation on circuit board 710 may include accelerometers enabling the system 700 to detect relative horizontal stability/instability on path, including deviations up or down and/or side to side. Such an accelerometer may collect data between strikes of a boring tool to determine deviation. In one aspect, an accelerometer may measure gravity data between strikes to make sure the embodiment is not pointed up or down, and possibly side-to-side.

In one embodiment a flexible coupling may be added between two segments of the pneumatic boring tool 704, or between pneumatic boring tool 704 and sensor carrier 702, such coupling equipped with optional transmit and receive coils whose signal may be used to determine the relative straightness of the pneumatic boring tool 704 and therefore of the bore.

Acoustic sensing may be added to the sensor array supported by the sensor carrier 702 in order to detect the change in resonance that would accompany the intersection with a cross bore as the exhaust air from the pneumatic boring tool 704 will resonate with a different pattern if the pneumatic boring tool 704 passes through a cross bore. Pressure sensors may be used to measure the form of an air pressure pulse in the bore behind the pneumatic boring tool 704 after each cycle of the piston hammer. The distinct change in pulse shape in the event the pneumatic boring tool 704 passes into an open cross bore, for example, may alert the operator to such an event. Although not required, the pulse or signal may be provided at a low frequency.

Differences in equilibrium between fluids into and out of the system may also be determined using suitable sensors. For example, when the boring tool 704 enters a sewer line, a larger portion (e.g., 60 cfm) of exhaust air may exit the sewer line. Tuning of the bore may be monitored like an organ pipe impulsively excited by the exhaust air. New resonances may be introduced and any former resonance structure may be damped as the rear of the tool passes a cross bore.

An air jet or a sound emitting component (e.g., a speaker) may be used to to create a local sound separate form and/or in addition to any sound created by the boring tool itself to create a sound that may be analyzed for changes in the acoustic environment inside the borehole (e.g., from cavities or voids, or reflections off of difference surfaces or materials).

Although not shown in FIG. 7, multiple sensors (e.g., via multiple sensor carriers) may be distributed throughout the borehole (e.g., along the air hose 706) to take various measurements that can be used to compare environmental characteristics at the location of each sensor. For example, information from two inertial sensors can determine an orientation of the system 700 as a whole or its individual parts, which may enable detection of when the boring tool 704 diverges from its intended path. Similarly, temperature deviations between two remote sensors may detect when one of those sensors enters an obstruction like a sewer line.

Alternatively, a single sensor can be used to capture temporally remote data for similar comparison (e.g., data at a first instance of time corresponding to a first location in a borehole, and data at a second instance of time corresponding to a second location in a borehole).

Figure 8:
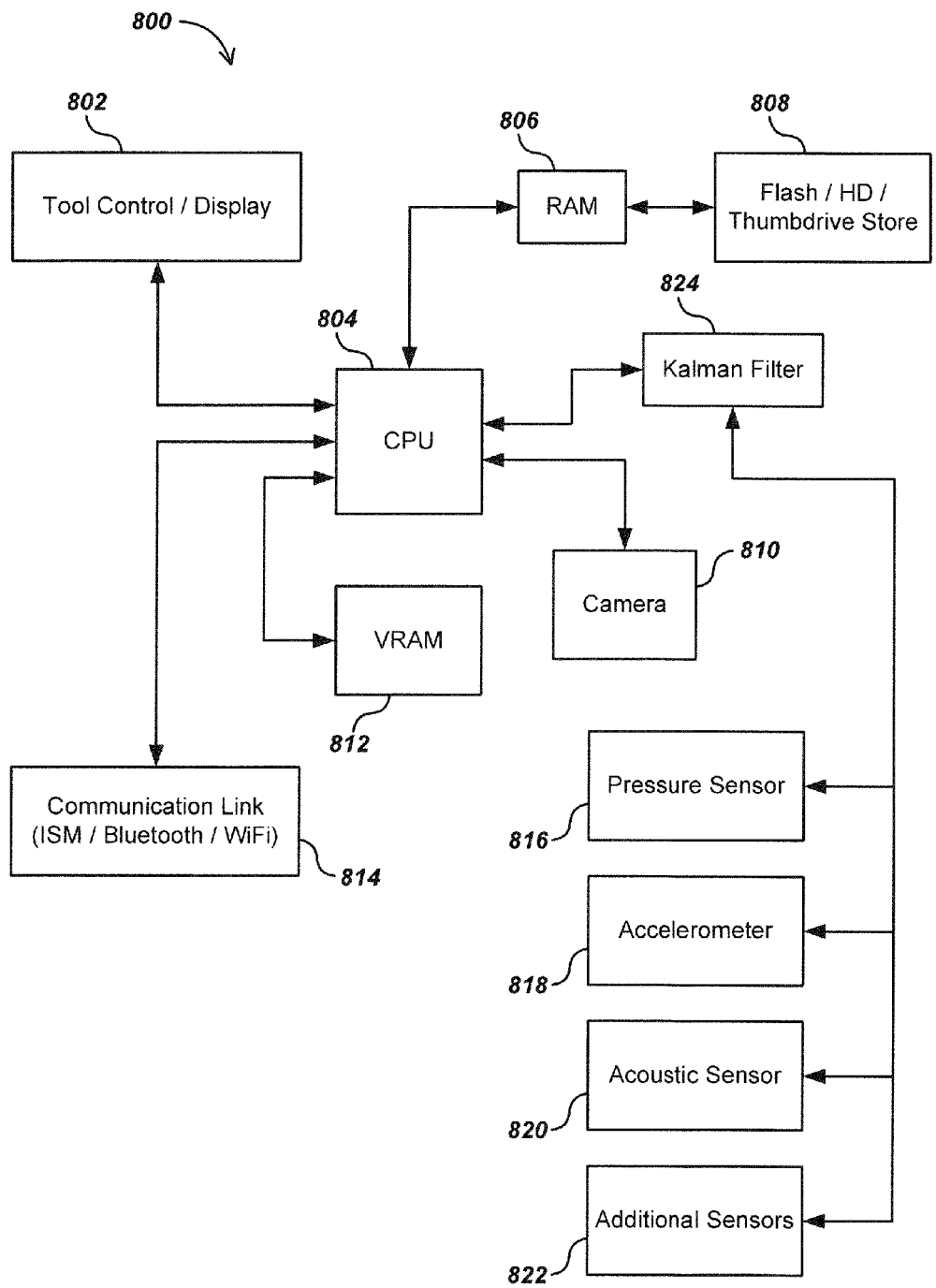
FIG. 8 is a block diagram of an exemplary pneumatic boring system.

Referring to FIG. 8, a block diagram of an exemplary system 800 is illustrated. A tool control and display unit 802 may be connected to a pneumatic boring system 700 (FIG. 7) by wired or wireless means. Within a tool control and display unit 802, a central processing unit (CPU) 804 may store information in random-access memory (RAM) registers 806 and may write information to a permanent memory store 808 such as a flash drive, hard disk, removal thumb drive or the like. Bore inspection camera 810 may transmit video data to the CPU 804 and then to a video memory 812 for display on the tool control and display unit 802. Communication by wired or wireless links, such as for example, ISM relay, Bluetooth, or other similar protocols, may be managed by a communication link module 814 in connection with the CPU 804. Sensor input from one or more pressure sensors 816, inertial sensors (e.g., accelerometers 818), acoustic sensors 820, and additional sensors 822 (e.g., vibration, thermal, chemical, moisture, current, magnetic, or other sensors) may be correlated or integrated by a Kalman filter 824 under control of the CPU 804. The results of such process may provide alerts or other signals to the operator via the tool control and display 802.

Figure 9:
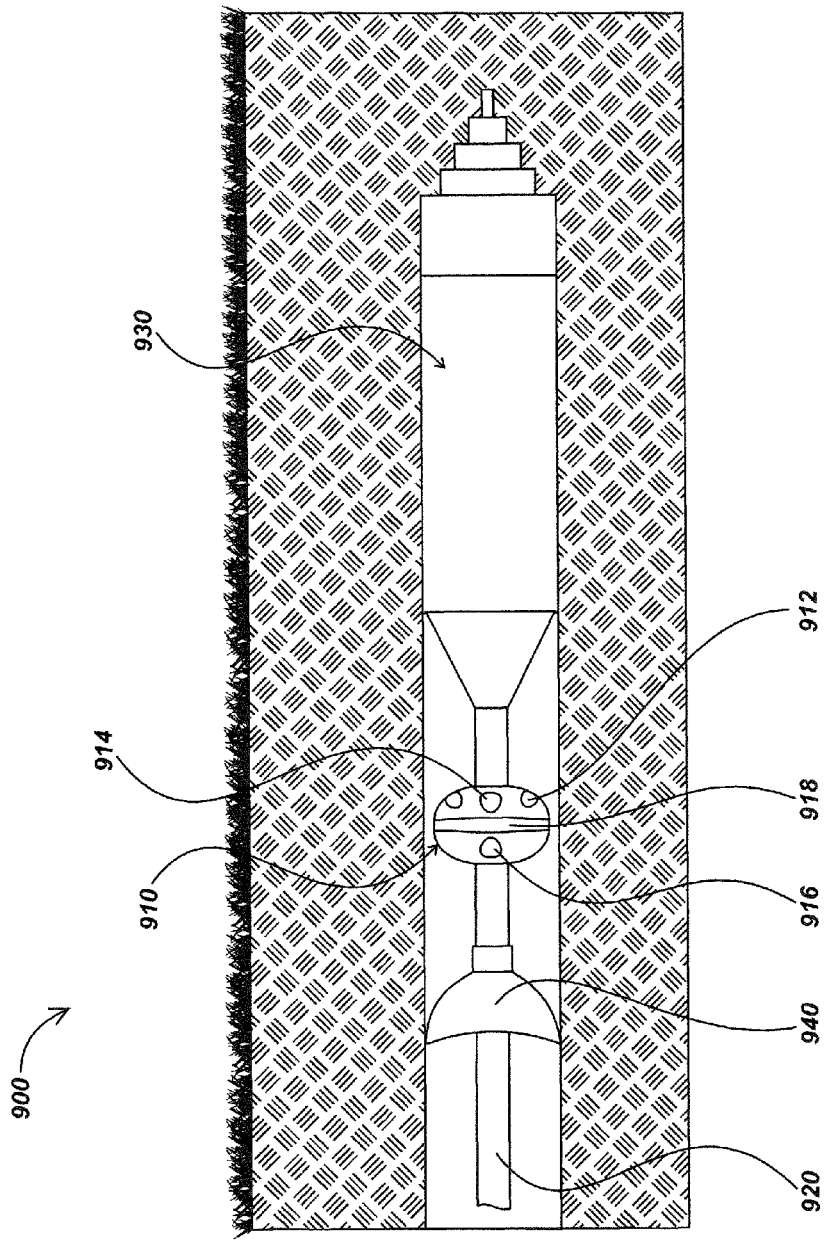
FIG. 9 is an embodiment of a pneumatic boring system.

Turning to FIG. 9, in one embodiment of a pneumatic boring system, such as the pneumatic boring system 900, a sensor apparatus 910 may be secured along the hose 920 such that the sensor apparatus 910 may be positioned behind the pneumatic boring head 930 but before a borehole seal or diaphragm 940 secured to the hose 920. In other embodiments, the seal 940 may be placed in a fixed position in the borehole (e.g., at the entrance), and the air hose 920 may be configured to pass through the seal 940 (e.g., via a sliding seal).

The sensor apparatus 910 may include one or more pressure sensors, microphones, and cameras 912-916 (collectively "sensors"). The configuration of the sensors may vary from the configuration shown in FIG. 9. The sensor apparatus 910 may also include a multitude of other sensors and other instrumentation such as, but not limited to, accelerometers, gyroscopes, motion sensors, magnetometers, compasses, sondes and acoustic sensors.

A sonde 918 may also be positioned in the sensor apparatus 910 or elsewhere in FIG. 9 (e.g., at or near components 910, 912, 914, 916, 920, 930 or 940 of FIG. 9). It is contemplated that the sonde may be used to track position of a collision, intersection or other underground event, and to also communicate data via any known modulation means such as FSK, PSK, and others. A similar sonde may also be configured at or near various components in other figures, including for example: components 204, 206, 208, 210 or 212 of FIG. 2; components 302, 304, 306, 310 or 312, of FIGS. 3A-B; components 504 or 506 of FIG. 5; components 602, 604, 606, 608, 610 or 612 of FIG. 6; or components 702, 704, 706, 708, 710 or 712 of FIG. 7. Sondes may be configured along any orientation, including horizontally aligned with the borehole, vertically aligned perpendicular to the borehole (as shown in FIG. 9), or aligned at another 3-dimensional orientation.

In use, data gathered by the sensor apparatus 910 may be transmitted via wired or wireless means to a CPU. The CPU may use this data to detect changes in pressure and/or acoustic resonance. If a change in pressure and/or acoustic resonance has been detected, this may indicate that the pneumatic boring head 930 has intersected and consequently punctured an underground utility line and such information may be further communicated to a user. Further confirmation of intersecting a buried utility line may be revealed via the cameras 916. A locator above the surface may be used to detect the location of the sonde. When the sonde is positioned at a point of collision, intersection or other underground event, position information the sonde provides may be used to map the collision, intersection or other event. The mapped position may then be correlated with the other information (e.g., the sensor information, other mapped information) to aid an operator in diagnosing and fixing any underground condition caused by the bore.

By way of example, an acoustic sensor (e.g., a microphone) may be positioned inside the bore to detect sound energy changes that occur when the borehole intersects a cavity or buried object (e.g., a sewer line). The acoustic sensor may monitor the acoustics of exhaust from the operation of the boring head 930, and detect changes in acoustic resonance. Similarly, a pressure sensor may be positioned inside the bore to detect pressure pulse variations that occur when the borehole intersects a cavity or buried object (e.g., a sewer line). The sensors may be positioned anywhere on the system 900, and are preferably positioned in any of the configurations disclosed in FIGS. 6-7 and 9 herein. In some embodiments, another acoustic and pressure sensor may be placed at the bore exit to detect any pressure difference and/or changes in acoustic resonance due to the possible intersection and puncturing of buried utility lines. Cross-correlation between the two signals of the two sensor pairs (e.g., two acoustic sensors) will change significantly if a boring tool passes into a crossing cavity or object (e.g., sewer line).

In one aspect, placing an ISM wireless microphone into a sewer line would likely receive a large acoustic signal. One or more ISM microphones may be disposed in the bore entrance and inside any nearby common sewer line. In another aspect, the level of cross correlation between the two acoustic signals may be measured. An acoustical wave guide (not shown) may also be used to direct acoustic signals.

In one aspect, each time the hammer piston cycles, the shape of the air pressure pulse in the bore behind the hammer may be measured. The pulse shape may change locally if the hammer breaks into an open cavity or object. The pulse or signal may be provided at a low frequency. A seal (e.g., borehole seal 940) may be disposed in a bore that follows behind the boring tool. The seal may be disposed annularly around the air hose and may be instrumented to provide a pressure transducer or a "pneumo" hose to measure pressure. The space between the back of the boring tool may be slightly pressurized with exhaust. The seal may include, for example, a low pressure bypass. For example, if the boring tool breaks into a void, like a sewer pipe, exhaust air may enter the sewer pipe and pressure may not build. Opening of the bypass valve may also be directly sensed. The sensing device associated with the seal may be powered via a battery or wired connection to another source of power, and may optionally provide an audible alert signal.

The seal 940 may be configured to move dirt away from the cameras, and may be configured to open when pressure in the volume between the seal 940 and the tail end of the boring head 930 changes (e.g., upon the volume intersecting with a cavity or object like a sewer line). Alternatively the seal 940 may include a sensor that detects variations in tension (e.g., when the tension lowers upon the seal entering a cavity).

Figure 10A:
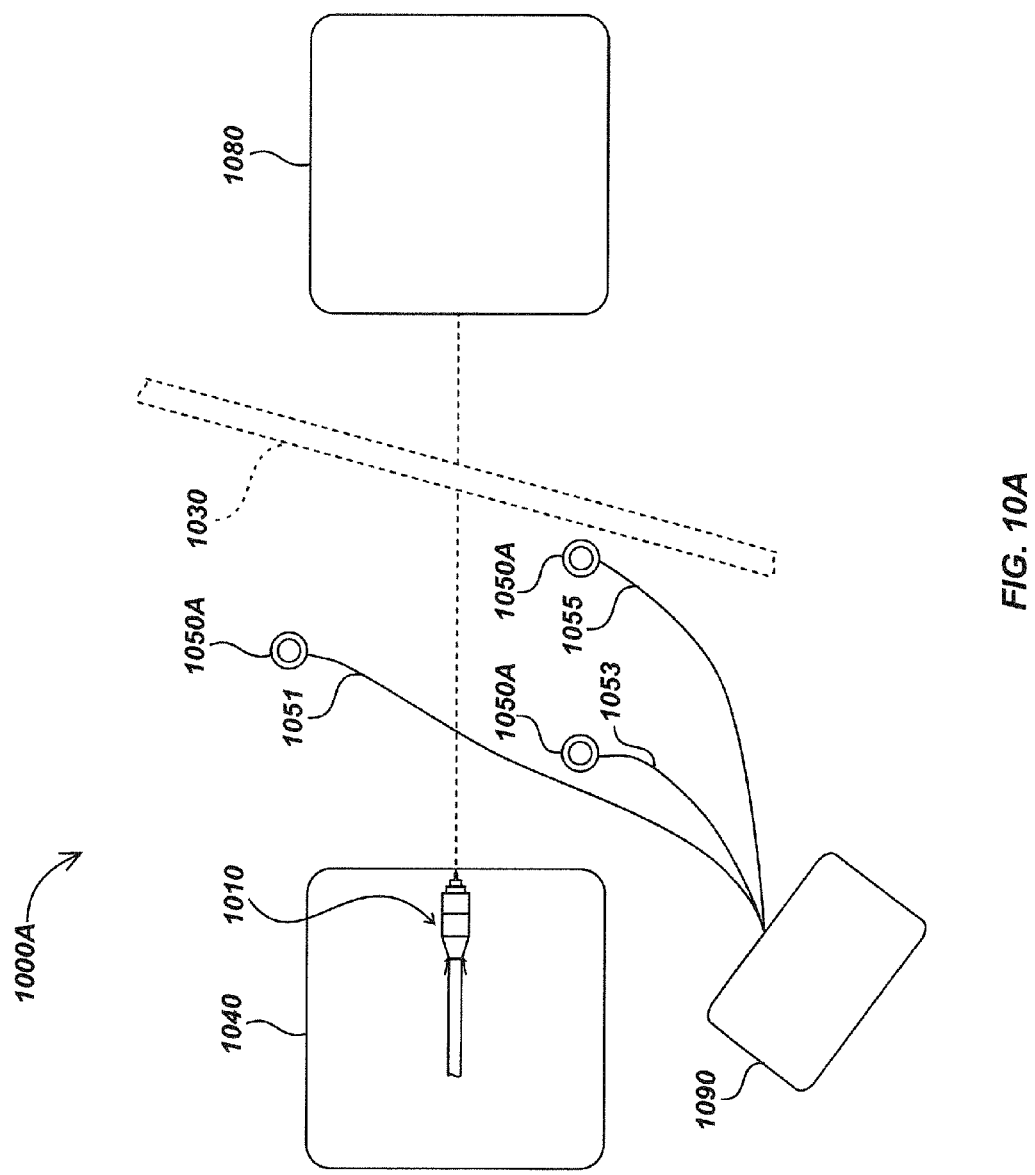
FIG. 10A depicts a bird's eye view of an acoustic tomography system.

Attention is now drawn to FIG. 10A, which depicts a bird's eye view of an acoustic tomography system 1000A in accordance with one or more aspects of the invention. As shown in FIG. 10A, a boring tool 1010 is configured to form a borehole extending underground between two pits 1040 and 1080. A plurality of acoustic tomography devices 1050A are positioned at various coordinates above the ground. Each of the devices 1050A may include a GPS sensor configured to determine the location of that device, a power source (e.g., battery), a power control, memory configured to store data, an input/output component (e.g., a USB drive or wireless communication transceiver) configured to receive or provide downloads of data, and a geophone (e.g., a three axis geophones) or similar components configured to measure locations of objects—e.g., buried utility 1030, a tree root, another manmade structure—or subsurface geological features—e.g., rocks, water table, soil composition. The devices 1050A, which may connect to a remote power source or computing device 1090 via power and/or utility lines 1053, may form an array configured to map locations of subsurface objects or other features in three dimensions.

All types of geophones are contemplated. For example, the geophones may be configured to convert ground movement or displacement (e.g., energy waves) into voltage, which may be recorded in the memory, and later used to analyze various subsurface characteristics around a borehole. During operation, the boring tool 1010 may generate seismic signals, and the geophones may record the seismic signals as deviations of measured voltage from some base line voltage.

By way of example, three axis geophones may include a visible magnetic compass mounted on top allowing an operator to orient each one to magnetic north. Alternately each geophone may include sensors such as magnetic compass, accelerometers and gyros allowing the orientation of each geophone with respect to the world coordinate system to be determined. Each geophone may also include a two or three GPS antenna array allowing orientation to be determined from the GPS positioning data. Certain of these features (among other related information) may be found in U.S. patent application Ser. No. 12/442,504, filed Mar. 31, 2012, entitled DUAL ANTENNA SYSTEMS WITH VARIABLE POLARIZATION, which is incorporate herein in its entirety for all purposes.

Collection of seismic responses by individual geophones may be associated with a GPS time reference for later correlation. The seismic responses may be used to identify locations of objects, which can be correlated with the location of a boring tool or a location of a subsurface condition (e.g., collision or intersection). A processor (not shown) may process the collected information, and a map may be generated to show the various subsurface features. Other information may be added to the map (e.g., previously stored information).

Figure 10B:
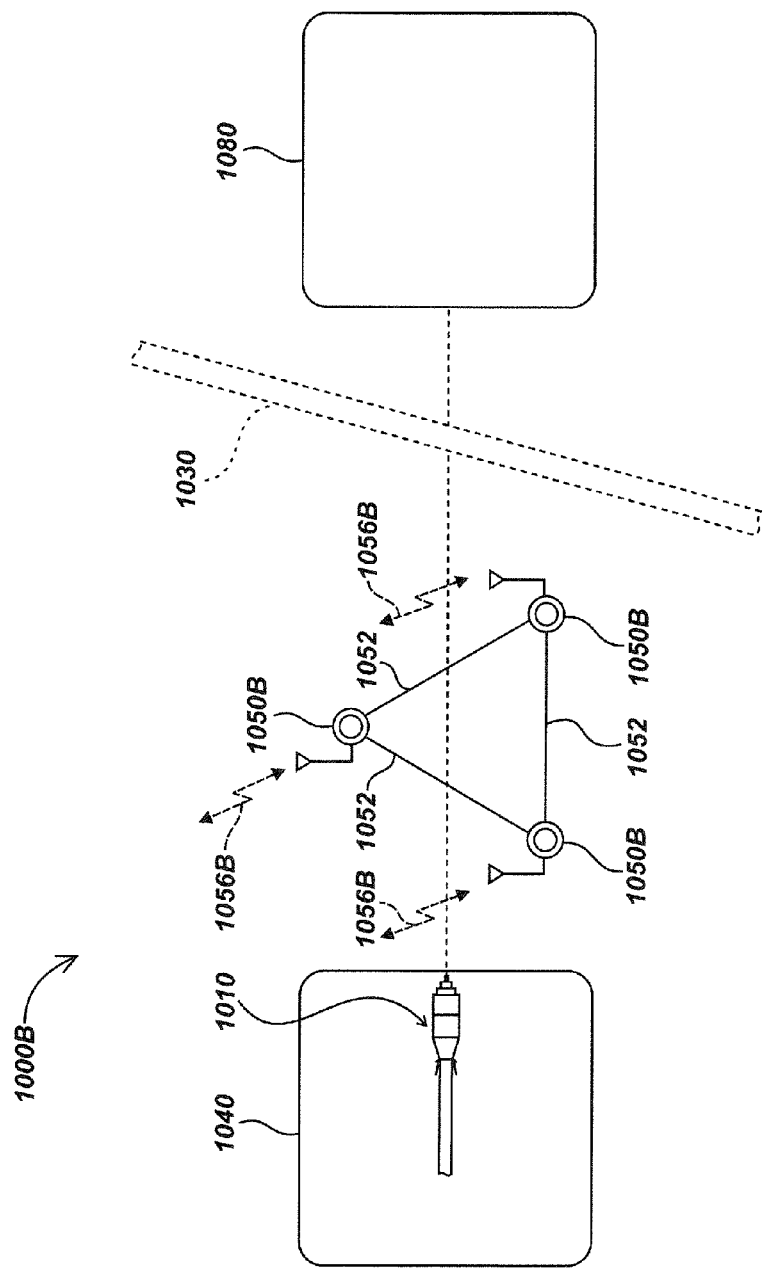
FIG. 10B depicts a bird's eye view of another acoustic tomography system.

FIG. 10B and FIG. 10C each illustrate a bird's eye view of the acoustic tomography system (e.g., a system 1000B and a system 1000C, respectively). As shown in FIGS. 10B and 10C, acoustic tomography devices 1050B and 1050C, respectively, may include wireless transceivers 1056B and 1056C, respectively for communicating data to remote devices. FIG. 10B also shows three ropes 1052 of equal length that may be used to position each of the acoustic tomography devices 1050B at the same distance from each other.

Acoustic location of buried utilities and faults in utilities is a well-known art. Electrical faults in cables can be made to produce sound by repetitively energizing the cable with a large capacitor. Each discharge of the cable may produce a "thump" at the site of the fault. Simple mechanical and electronically amplified stethoscopes can be used to iterative search for leaks and the thumps produced in faulted cables. Some usage of such devices presupposes a knowledge of a location of a pipe, utility or other object. Digital signal processing can be applied to the signals from several geophones to beam form. The inclusion of geophone beam forming and/or cross correlation in a portable locator enables several new techniques. The portable locator can often locate both a leaking utility and nearby buried utilities by stray electromagnetic emissions from the utilities, and the show the location of the utility leak on a display relative to nearby utilities.

A portable locator with acoustic detection accessories can be used to ensure that the acoustic tomography devices are placed advantageously with respect to the buried utility. Many soils can be strongly attenuating for sound. Acoustic sensors that are misplaced even a few meters may not receive any usable acoustic signal. The acoustic detector accessories may include low frequency magnetic dipole sources that can be tracked by the portable electromagnetic locator. The acoustic processing scheme embedded into the portable locator thus has access to both the relative position and orientation of the acoustic sensors. Relative orientation is particularly important in the case where the acoustic sensors are 3 axis sensors. The acoustic signal from interfering noise sources often propagates as a ground wave with substantial horizontal components, whereas a leak signal or thumper signal can be nearly vertical. The horizontal components of the acoustic signal may arrive from a different azimuth than the interfering signals. Knowledge of the relative orientations of the sensors and utilities makes the construction of adaptive noise canceling filters better.

A variety of sound sources may be included as accessories for the portable locator. Impulsive hammers may be manually actuated or pneumatically, electrically, or hydraulically actuated. In the case of tracking a horizontal drill, the acoustic source can be driven by energy from the pressurized drilling mud. The horizontal drill acoustic source may be specifically designed as an acoustic source or the noise produced by a rock drill hammer attached to the string may be used. In many instances the noise produced by the interaction of the drill head with rocks and cobble will produce sufficient acoustic energy to track the drill string and acoustically image nearby utilities.

Some parameters of pipes may be derived from the acoustic energy scattered by the pipes. The lowest frequencies modes of pipes are breathing modes. In the breathing modes, the prime contours of the cylindrical shell move in and out. At mid-frequencies, antisymmetric and symmetric leaky Lamb waves are strong contributors to the scattering. The high frequency scattering may be controlled by the wall thickness of the scattering pipe or conduit.

Various methods of manufacture are contemplated to create various aspects of the disclosure, including machining, molding, 3-dimensional printing, and other methods of manufacturing the various aspects. Various materials are also contemplated, including metals, plastics, ceramics, and combinations thereof.

As previously described, alerts may be generated. Once generated, the alerts may be provided to a user, or may result in some automated action. For example, an alert (e.g., one related to an underground condition or characteristic, including a collision, intersection, mapping of an object, or other) may cause a boring tool to shut down, may cause one or more sensors to collect information, or may cause a location component to send a location signal.

Locations of conditions or characteristics may be determined using various means, including sonde transmissions to a locator, a counter that counts a length of inserted hose line (e.g., a roller along which the hose passes, or a roller that rolls along the surface of a bore), or other means. Alternatively, a detection coil may be positioned in the boring tool or nearby (e.g., on a hose, in a sensor carrier), and may be configured to sense the location(s) of transmitted signals from other components (e.g., above-ground sondes; buried objects). Sensed locations could then be used to correlate the location of the detection coil. Alternatively, a disposable tracing wire could be used to determine a length of a borehole.

As used herein, the term "borehole" may refer to any underground hole, tunnel or other cavity formed by drilling, digging, burrowing or otherwise moving earth. Likewise, the term "bore" may refer to any device configured to form such holes, tunnels or other cavity underground.

It is noted that as used herein, the term "air hose" may refer to any type of air hose, including a compressed air hose, a hammer air hose, and an elongate air hose. One of skill in the art will appreciate that the aspects described herein with respect to air hoses and pipes apply to other systems and system components beyond boring systems, pipes and hoses.

It is understood that the specific order or hierarchy of steps or stages in any processes or methods disclosed herein are examples of exemplary approaches. Based upon design preferences, it is understood that the specific order or hierarchy of steps in the processes may be rearranged while remaining within the scope of the present disclosure unless noted otherwise.

Those of skill in the art would understand that information and signals, such as video and/or audio signals or data, control signals, or other signals or data may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, electro-mechanical components, or combinations thereof. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative functions and circuits described in connection with the embodiments disclosed herein with respect to camera and lighting elements may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps or stages of a method, process or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The content of each the following publications is also incorporated by reference herein in its entirety: Willoughby, David (2005), Horizontal Directional Drilling, p. 1-263, Mcgraw-Hill, New York. ISBN 007145473X; Short, Jim (1993), Introduction to Directional and Horizontal Drilling, p. 1-222, PennWell Books, Tulsa, Okla. ISBN 0878143955; v. Hinueber, Edgar (2006), Most accurate drilling guidance by dead-reckoning using high precision optical gyroscopes, Proceedings NoDig Conference of Horizontal Directional Drilling, Brisbane 2006; Claerbout, Jon F. (1985), Fundamentals of Geophysical Data Processing, p. i-266, Blackwell Scientific Publications, Palo Alto, Calif. ISBN 0865423059; Claerbout, Jon F. (1984), Imaging the Earth's Interior, p. i-392, Blackwell Scientific Publications, Palo Alto, Calif.; and Claerbout, Jon F. (2010), Basic Earth Imaging, p. i-218.

The disclosure is not intended to be limited to the aspects shown herein, but is to be accorded the full scope consistent with the specification and drawings, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the disclosure is not intended to be limited to the aspects shown herein but is to be accorded the widest scope consistent with the principles and novel features disclosed herein.

We claim:

1. A system for boring boreholes and inspecting the path of the boreholes, comprising:
   an air supply unit to supply pressurized air;
   an air hose coupled to the air supply unit;
   a pneumatic boring head assembly releasably coupled to the air hose, the pneumatic boring head assembly comprising:
      a pneumatic soil displacement hammer element operatively driven by the pressurized air supplied by the air supply unit through the air hose to drive a tip of the pneumatic boring head assembly for creating a borehole beneath a ground surface;
      a sensor carrier assembly comprising a plurality of sensors for inspecting the created borehole, the plurality of sensors including at least a pressure sensor for taking a first pressure measurement during a first time period, an acoustic sensor for taking a first acoustic measurement during the first time period, and an image sensor for capturing a first image during the first time period, wherein the plurality of sensors in the sensor carrier assembly are activated for measurements upon releasing the pneumatic boring head assembly from the air hose; and
      a magnetic dipole sonde to generate magnetic field signals detectable for tracking a first position of the pneumatic boring head assembly; and
   a processing component including a processor and a non-transitory data storage memory, wherein the memory includes program instructions for causing the processor to correlate the first pressure measurement, a first acoustic measurement, and the first image, and identify, based on the correlation, an intersection between the borehole and an object or cavity inside the borehole at the first position.

2. The system of claim 1, wherein one or more of the plurality of sensors collect first information at a first time and second information at a second time, and wherein the intersection between the borehole and the object or cavity are based on both the first information and the second information.

3. The system of claim 2, wherein the first information includes a first pressure measurement by a first pressure sensor at a first instance of time, and a second pressure measurement by the first pressure sensor at a second instance of time, and wherein the intersection is identified by the processing component based on a determination of when a difference between the first and second pressure measurements exceeds a threshold amount of change.

4. The system of claim 3, wherein the first pressure measurement includes a first air pressure pulse shape, and the second pressure measurement includes a second air pressure pulse shape.

5. The system of claim 2, wherein the first information includes a first pressure measurement by a first pressure sensor at a first instance of time, and a second pressure measurement by a second pressure sensor at the first instance of time, and wherein the intersection is identified by the processing component based on a determination of when a difference between the first and second pressure measurements exceeds a threshold amount of change.

6. The system of claim 2, wherein the first information includes a first acoustic measurement by a first acoustic sensor at a first instance of time, and a second acoustic measurement by the first acoustic sensor at a second instance of time, and wherein the intersection is identified by the processing component based on a determination of when a difference between the first and second acoustic measurements exceeds a threshold amount of change.

7. The system of claim 1, further comprising taking a second acoustic measurement, wherein the first acoustic measurement includes a first measured resonance of exhaust air from a boring tool, and the second acoustic measurement includes a second measured resonance exhaust air from a boring tool.

8. The system of claim 2, wherein the first information includes a first acoustic measurement by a first acoustic sensor at a first instance of time, and a second acoustic measurement by a second acoustic sensor at the first instance of time and wherein the processing components identifies the first intersection when a difference between the first and second acoustic measurements exceeds a threshold amount of change.

9. The system of claim 2, wherein the first information includes a first acoustic measurement by a first acoustic sensor at a first instance of time, a second acoustic measurement by a second acoustic sensor at the first instance of time, a third acoustic measurement by the first acoustic sensor at a second instance of time, a fourth acoustic measurement by the second acoustic sensor at the second instance of time, the system further comprising:
   the processing component including the processor and the non-transitory memory, wherein the memory includes program instructions for causing the processor to determine a first difference between the first and second acoustic measurements, and a second difference between the third and fourth acoustic measurements, the program instructions further causing the processor to identify the first intersection when a third difference between the first difference and the second distance exceeds a threshold amount.

10. The system of claim 1, further comprising:
    the processing component including the processor and the non-transitory memory, wherein the memory includes program instructions for causing the processor to identify a first collision between a bore and a utility conduit along the borehole based on the first pressure measurement, the first acoustic measurement or the first image.

11. The system of claim 1,
    wherein the sonde is mechanically coupled to the air hose.

12. The system of claim 1, wherein the plurality of sensors include one or more acoustic tomography sensors for collecting position information relating to a buried utility conduit that intersects with the borehole based on seismic signals generated by a pneumatic boring head assembly during operation of the pneumatic boring head assembly.

13. The system of claim 1, further comprising:
    an above-ground processing component including a processor and a non-transitory memory, wherein the memory includes program instructions for causing the processor to analyze sensor measurements from other of the one or more sensors.

14. The system of claim 13, wherein the above-ground processing component is further configured to generate an alert signal when the sensor measurements indicate an occurrence of a collision between a boring tool and a buried utility conduit along the borehole, the system further comprising:
    an output display component to provide an audible or visual representation of the alert signal to a user.

15. The system of claim 1, further comprising:
a boring tool coupled to the air hose, wherein the sensor carrier assembly is coupled to the boring tool.

16. The system of claim 1, further comprising:
a boring tool coupled to the air hose, wherein the sensor carrier assembly is coupled to an external surface of the air hose.

17. A system for inspecting the path of a borehole beneath a surface, the system comprising:
- a camera to collects information relating to an intersection of the borehole and an object or cavity beneath the surface;
- a hose attachment assembly comprising an outer hose attachment component and an inner hose attachment component, said outer hose attachment component and said inner hose attachment component each configured to couple with each other, and wherein the outer hose attachment component includes an outer quick-release coupling feature to couple to an inner quick-release coupling feature of the inner hose attachment component;
- an object attachment assembly, including an opening, to receive the camera through the opening, wherein the object attachment assembly comprises an outer pipe attachment component and an inner pipe attachment component, said outer pipe attachment component and said inner pipe attachment component each being configured to couple with each other, and wherein the outer pipe attachment component includes an outer quick-release coupling feature to couple to an inner quick-release coupling feature of the inner pipe attachment component;
- at least one rod having a first end and a second end, wherein the first end couples to the hose attachment assembly and the second end couples to the object attachment assembly; and
- a locking feature for locking the at least one camera inside the opening, wherein the hose attachment assembly couples to a hose, and the object attachment assembly couples to a pipe or other utility.

18. A system for inspecting the path of a borehole beneath a surface, the system comprising:
- a sensor carrier assembly including a tail assembly detachably uncoupleable from an air hose;
- a plurality of sensors disposed on or in the sensor carrier assembly, the plurality of sensors including:
- at least a first sensor for taking a first sensor measurement during a first instance of time and a second sensor measurement during a second instance of time; and
- a second sensor for taking a third sensor measurement during the first instance of time and a fourth sensor measurement during the second instance of time;
- a processing component including a processor and a non-transitory memory, wherein the memory include program instructions for causing the processor to determine a first difference between the first and third sensor measurements, and a second difference between the second and fourth sensor measurements, and identify an intersection between the borehole and an object or cavity based at least in part on the determination.

\* \* \* \* \*